No. 660,845. Patented Oct. 30, 1900.
T. A. EDISON.
APPARATUS FOR SAMPLING, AVERAGING, MIXING, AND STORING MATERIALS IN BULK.
(Application filed Jan. 11, 1900.)
(No Model.) 3 Sheets—Sheet 1.
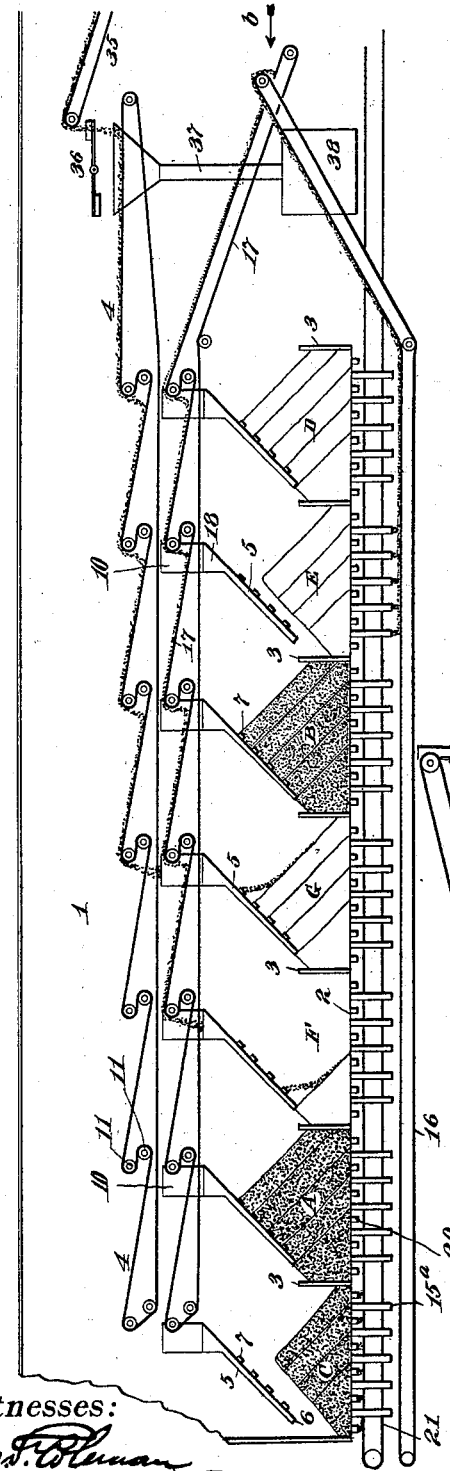
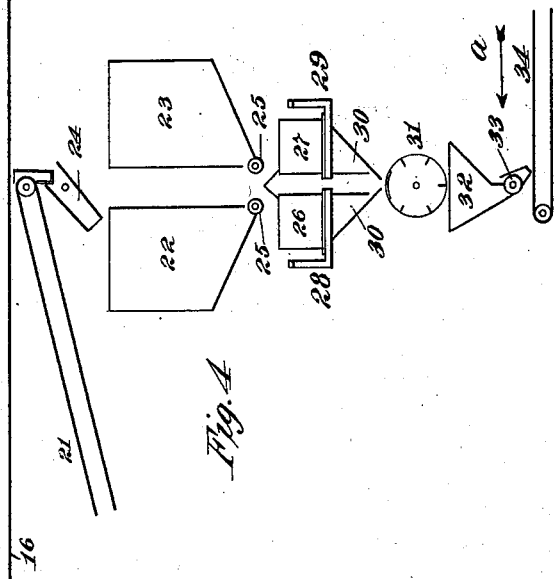
Witnesses:
Inventor
Thomas A. Edison
by Dyer Edmonds Dyer
Att'ys.

No. 660,845. Patented Oct. 30, 1900.
T. A. EDISON.
APPARATUS FOR SAMPLING, AVERAGING, MIXING, AND STORING MATERIALS IN BULK.
(Application filed Jan. 11, 1900.)
(No Model.) 3 Sheets—Sheet 2.
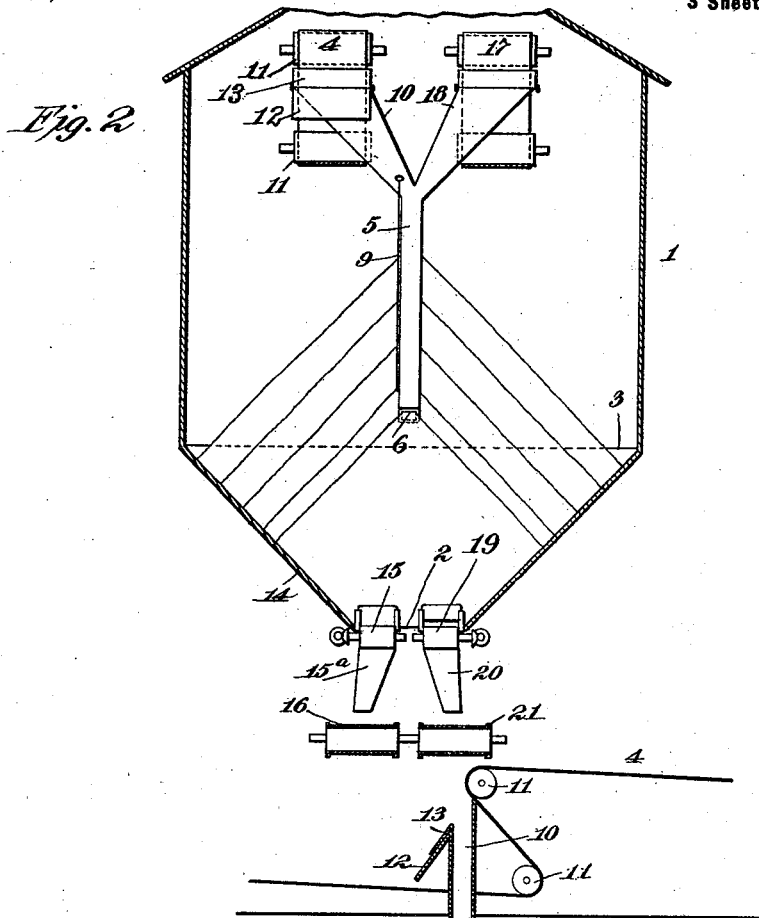
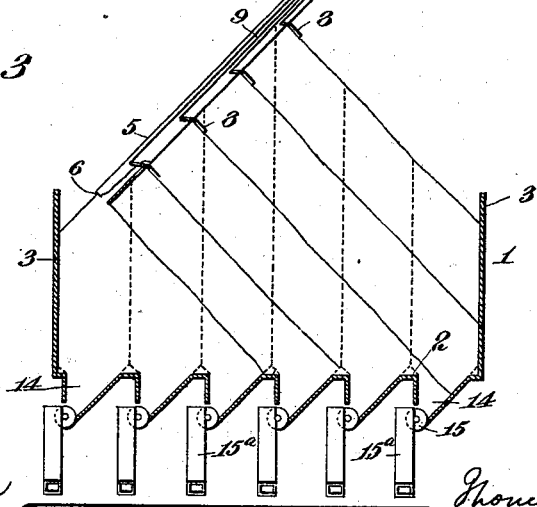
Witnesses:
Inventor
Thomas A. Edison
by
Dyer Edmonds & Dyer
Att'ys.

No. 660,845. Patented Oct. 30, 1900.
T. A. EDISON.
APPARATUS FOR SAMPLING, AVERAGING, MIXING, AND STORING MATERIALS IN BULK.
(Application filed Jan. 11, 1900.)
(No Model.) 3 Sheets—Sheet 3.
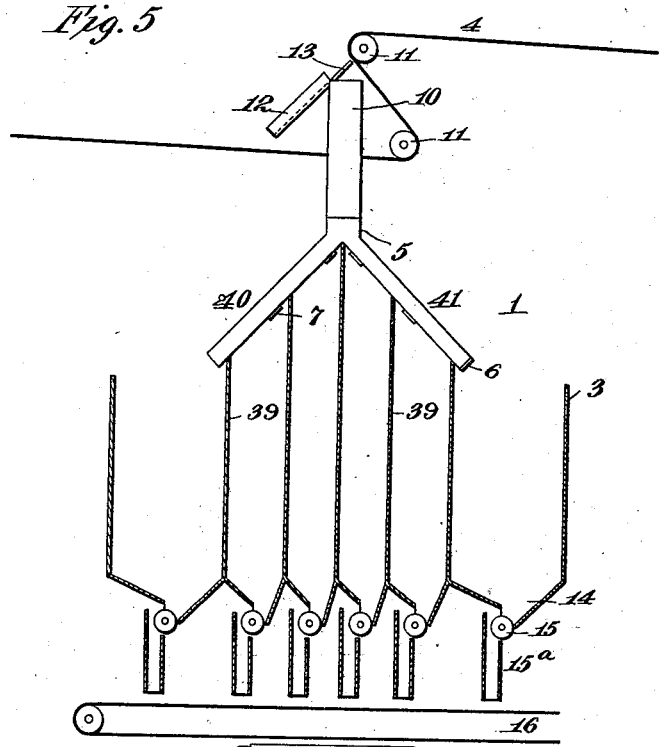
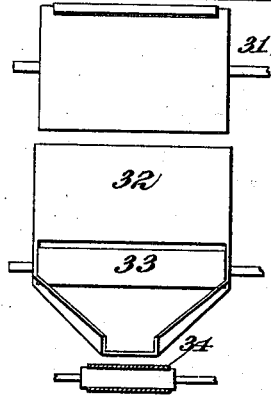
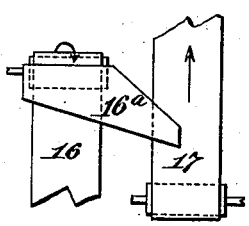
Witnesses:
Inventor
Thomas A. Edison
by Dyer Edmonds & Dyer
Att'ys.

UNITED STATES PATENT OFFICE.

THOMAS A. EDISON, OF LLEWELLYN PARK, NEW JERSEY.

APPARATUS FOR SAMPLING, AVERAGING, MIXING, AND STORING MATERIALS IN BULK.

SPECIFICATION forming part of Letters Patent No. 660,845, dated October 30, 1900.

Application filed January 11, 1900. Serial No. 1,093. (No model.)

*To all whom it may concern:*

Be it known that I, THOMAS A. EDISON, a citizen of the United States, residing at Llewellyn Park, in the county of Essex and State of New Jersey, have invented a certain new and useful Apparatus for Sampling, Averaging, Mixing, and Storing Materials in Bulk, (Case No. 1,025,) of which the following is a description.

My invention relates to various new and useful improvements in apparatus for sampling, averaging, mixing, and storing materials in bulk; and the object of the invention is to provide an apparatus by which ore, rock, or other material in bulk having a variable assay may be sampled and so averaged as to give in its bulk an even assay corresponding to the average assay of the samples, so that the further addition of any necessary ingredient in a subsequent operation upon the ore, rock, or other material in bulk can be so made as to produce an even product or result.

My apparatus also contemplates the storing of the averaged material and the effective mixing thereof with such a further ingredient.

In my concurrent application (Case No. 1,020) I describe an improved process of sampling, averaging, mixing, and storing materials in bulk and illustrate its peculiar adaptability for use in connection with the manufacture of Portland cement from silicious limestone and lime.

My present invention is designed to offer a convenient form of apparatus for the carrying out of the process described and claimed in my said application.

When my improved apparatus is used in the manufacture of Portland cement, it comprises a stock-house of great capacity located adjacent to a crushing plant and to which stock-house the crushed cement-rock may be directed after having passed through a drier, if necessary, the cement-rock and limestone being permitted to accumulate in the stock-house in separate deposits, distributing mechanism being employed in connection with the stock-house for so delivering the cement-rock and limestone to the several deposits therein that when material is drawn off at several points from the bottom of any one of said deposits portions of the material first introduced into that deposit shall be mixed with and carried off with portions thereof introduced at subsequent times in the formation thereof. The apparatus also comprises a sampling device of any suitable character, by means of which the material, as it passes into the stock-house, will be continuously sampled, whereby samples of such material—for instance, of one pound each—may be removed at short intervals of time—for instance, each minute—during the formation of each deposit of cement-rock or limestone in the stock-house. The capacity of each of the deposits of material is preferably such that it shall be the product of at least one day's operation of the crushing plant to permit ample time being given to the chemist at the establishment to make a careful assay as an average of all the samples taken from any one of the deposits, which assay when ascertained will obviously represent the average assay of the whole deposit. Unless, however, each of the deposits is thoroughly mixed or averaged when drawn off to be transported to another part of the establishment for mixing with the limestone the assay thereof would in almost every case vary considerably, because at one time the material delivered thereto may be relatively high in silica, while at another time the material may be low in silica, so that unless the entire deposit were properly averaged the cement-rock fed to the mixing apparatus would at different times vary in silica, whereas the deposit as a whole would have a definite assay corresponding to that of the samples therefrom considered as a whole. Hence it is essential not only that the actual assay of the whole deposit shall be determined by taking samples therefrom, as explained, but that it shall be so drawn out of the stock-house as to be perfectly averaged, whereby its assay shall correspond to that of the samples. In order that this may be effected, the apparatus also contemplates the provision of a feed-spout arranged at one or both sides of each of the deposits as they are formed, each of said spouts being provided with an open lower end and with several apertures in its bottom adapted to be closed by suitable manually-operated valves, whereby, as I shall explain, the material fed to each deposit will be distributed in the form generally of inclined layers or of essentially vertical layers.

The apparatus further contemplates the provision of means, such as a plurality of roller-feeds, for drawing off the material from any one of the deposits from the bottom thereof, whereby, by reason of the stratified formation of the deposit, the material as it is removed therefrom will, if assayed, roughly approximate the assay of the samples representative of said deposit. The averaging secured in this way is not, however, sufficiently perfect as to enable a uniform Portland cement to be made by adding any definite proportion of limestone to the cement-rock so drawn off, and in order therefore that a perfect averaging of any one of the deposits of either the cement-rock or of the limestone can be secured the apparatus further contemplates the provision of redistributing devices, by means of which the material from any deposit can be drawn off, as explained, and again deposited at another portion of the stock-house in a new deposit, which also is preferably stratified in formation and from which the material can be drawn off—as, for instance, through a plurality of roller-feeds—in such an intermixed and averaged condition as to give an assay which shall correspond throughout substantially with the average assay of the samples.

When the apparatus is used in the manufacture of Portland cement, it further comprises improved mechanism by means of which the addition to the cement-rock of the correct proportion of limestone and the subsequent mixture of the materials can be economically and automatically effected.

In order that the invention may be better understood, attention is directed to the accompanying drawings, forming a part of this specification, and in which—

Figure 1 represents diagrammatically a longitudinal section of a stock-house having a capacity for seven separate deposits, each being large enough to accommodate one day's operation of the crushing plant; Fig. 2, an enlarged cross-sectional view thereof through one of the deposits, illustrating the preferable conical formation thereof, the section being taken between any two of the chutes; Fig. 3, an enlarged longitudinal sectional view through one of the deposits of the same character, the section being taken centrally through one of the chutes; Fig. 4, a diagram of the mixing apparatus; Fig. 5, a longitudinal section of a modified form of bin intended for the formation of the deposits in vertical strata; and Figs. 6 and 7, detail views looking in the direction of arrows $a$ and $b$ in Figs. 4 and 1, respectively.

In all of the above views corresponding parts are represented by the same numerals of reference.

The stock-house 1 is made in any suitable form, being provided with a bottom 2, which may be either flat or hopper-shaped. A series of partitions 3 3 divide the interior of the stock-house into several bins, each adapted to receive a deposit of the material.

4 represents an endless conveying-belt traveling in the upper portion of the stock-house and to which the material from the crushing plant is delivered. Over each bin formed by the partitions 3 3 is an inclined feed-spout 5, having an open end 6 and provided with a series of openings 7 in its bottom. Each of the openings 7 is controlled by a suitable valve or flap 8 of any desired character and adapted to be opened and closed by a rod 9 under the control of the operator. The character of valve illustrated generally in the drawings is of a well-known type, consisting of a flap which is carried on a pivoted rock-shaft, there being a crank on one end of the rock-shaft to which the operating-rod is connected, so that by pulling or pushing on the rod the flap may be opened or closed. Each of the spouts 5 is provided with a hopper 10 at its upper end, into which the material is deposited from the belt 4 by passing the belt over pulleys 11 11, as is common. The hopper 10 is provided with an overflow 12, by which excess of material from the feed-spout 5 will be allowed to fall upon the belt 4 and be carried on to the next feed-spout. The hopper 10 is preferably provided with a flap 13, by means of which material may be deflected immediately through the overflow 12 and be prevented from entering any one of the feed-spouts 5. The lower sides of each bin are inclined, as shown, and at the bottom said sides are formed into a series of hoppers 14, as shown clearly in Fig. 3, said hoppers being arranged one in front of the other, and placed within one side of each of said hoppers is a roller-feed 15, the spout 15$^a$ of which allows material from within the hopper to be directed to a feed-belt 16, by means of which the material from any one of the deposits may be drawn off and deposited, through a lateral chute 16$^a$, (see Fig. 7,) onto an endless mixing-belt 17, which extends, preferably, parallel with the feed-belt 4 at the top of the stock-house. For the sake of clearness, in Fig. 1 I illustrate the mixing-belt 17 as being carried on a plane below the belt 4; but the preferred location of this mixing-belt with respect to the belt 4 is shown in Fig. 2, both belts being maintained in the same plane. The mixing-belt 17 passes over a plurality of pulleys corresponding to pulleys 11 11 and deposits material into one or more hoppers 18, arranged above each of the bins and communicating with the spouts 5. The hoppers 18 are the same in construction and operation as the hoppers 10, and said hoppers 10 and 18 both feed into the same feed-spout, as will be seen. Mounted within each of the hoppers 14, at the sides of the roller-feeds 15, are other roller-feeds 19, delivering into spouts 20, corresponding to the spouts 15$^a$. Extending beneath all of the spouts 20 is an endless belt 21, by means of which the averaged material may be carried to a suitable mixing apparatus, as shown in Fig. 4. In Fig. 1, for the purpose of clearness, I show the belts 16 and 21 as being extended on different planes; but preferably these belts are arranged side by side, as shown in Fig. 2. The said mixing apparatus comprises two bins or receptacles 22 23, one for containing cement-rock and the other for containing limestone. These bins are of great capacity—say one hundred tons each. A movable feed-spout 24 is pivoted above the two bins, whereby material from the belt 21 may be deposited into one or the other of said bins. Each of the bins 22 and 23 is provided with a roller-feed 25 therein, and located beneath said roller-feeds are smaller receptacles 26 and 27, carried on platform-scales 28 and 29, of any desired construction. The flow of material from the receptacles 26 and 27 may be controlled in any suitable way. From the receptacles 26 and 27 the material may be drawn off by means of spouts 30 and deposited into a mixing apparatus 31, of any suitable type. I illustrate diagrammatically a well-known form of rotary mixer for this purpose, said mixer being provided with ribs extending longitudinally thereof to thoroughly agitate the material. Located beneath the mixing apparatus 31 is a hopper 32, into which the mixed material may be deposited, said hopper being provided with a roller-feed 33 for feeding the mixed material therefrom onto an endless conveying-belt 34, leading to a suitable storage stock-house for the mixed material.

In order to carry the material from the crushing plant, I prefer to employ a conveying-belt 35, between which and the conveyer 4 may be located a sampling apparatus 36 of any suitable type, arranged to automatically remove from the material falling from the belt 35 a small sample at regular intervals of time—for instance, one pound each minute. These samples from the sampling-machine are conveyed by means of a chute 37 to a sample-receptacle 38.

I prefer to utilize an apparatus of the kind above described for the carrying out of my improved process, said apparatus being provided above each bin with a single inclined feed-spout, whereby, as will be explained, the material will be caused to accumulate in each bin in the form of a conical pile in stratified layers. It will be understood, however, that the material may be accumulated in other forms of deposits—for example, in vertical layers—by dividing each bin into a number of vertical compartments by means of partitions 39, as shown in Fig. 5. With such a modification the feed-spout 5 is provided with two branches 40 and 41, extending over the several compartments of each bin, as shown. With this modification the several compartments of each bin may be proportioned so as to be of substantially the same capacity, as shown. With this modification each branch 40 and 41 of the feed-spout will be provided with valved openings 7, as is the case with a single feed-spout, and the said openings will be controlled in the same way by means of valves and operating-rods, as I have already described. The bottom of each compartment will be provided with two roller-feeds 15 and 19 therein, so that material can be drawn off simultaneously from all of the compartments and deposited upon the belt 16 or 21, as the case may require. In the description of the operation which is carried out in the apparatus I will first have reference to the formation of the material in conical piles by the employment of a single feed-spout for each bin.

In the representation of the stock-house shown in Fig. 1 I have indicated two full cones A and B, representing limestone, a cone C of limestone which has been partly removed, a full cone D of cement-rock, a portion of a cone E of cement-rock which is being redistributed, averaged, and deposited at F, and a cone G of cement-rock which is being formed by direct deposit from the crushing plant. It will be of course understood that this arrangement and number of cones can be varied to suit any condition of actual operation.

With an apparatus of the character explained, and in the manufacture of Portland cement, I carry on my process in the following way: Material from the crushing plant, after being passed through a drier, if necessary, will be conveyed by the belt 35 and deposited on the belt 4, samples thereof being taken automatically by means of the sampling-machine 36 and deposited in the receptacle 38. The deflecting-flaps 13 of the feed-spouts for the piles B, E, and D are closed, so that the cement-rock will be carried by the belt 4 and will be deposited in the feed-spout 5 for the pile G. The valves 8 of that feed-spout are all closed by the attendant, and material will therefore flow out of the lower end of the feed-spout and accumulate in a pile essentially conical in shape, as shown in Fig. 3. When this pile reaches the open end of the feed-spout, material will immediately accumulate therein and will overflow through the spout 12. As soon as this is observed by the attendant the valve 8 for the lowermost opening is opened, whereupon the material accumulated in the feed-spout will immediately flow out therefrom and material will begin to accumulate in the form of a partial cone, as shown, which will abut against the cone formed by the material flowing out of the lower end of the spout 5. When this partial cone is formed, material will once again accumulate in the feed-spout, giving notice to the attendant by overflowing, whereupon the valve for the second opening will be operated and a new partial cone will be formed, these operations being repeated until the entire cone is produced of a number of stratified or overlapping partial cones, as shown very clearly in Fig. 3. Each of these cones will preferably be of sufficient capacity to represent at least a day's operation of the crushing plant, so that ample time will be afforded the chemist in charge to make a proper assay. Obviously the samples which have accumulated in the receptacle 38 will, if intimately mixed together, give an assay correctly representative of that of the cone as a whole, and this assay is made in any suitable way from such samples. Assuming the cone in question to have been formed in one day, the averaging of the same will be preferably effected on the succeeding day by allowing the material therefrom to be drawn off through the roller-feeds 15 and deposited on the conveying-belts 16. I represent in dotted lines in Fig. 3 the contents of each of the cones or piles which will be drawn off therefrom by each of the roller-feeds, from which it will be obvious that in every case the material withdrawn by one of the roller-feeds will have been accumulated onto the original cone at diverging times. Thus if it be assumed that each of the five partial cones forming the entire pile were formed in two hours the operation of all the roller-feeds will result in material being drawn off from the pile which will be representative of the run of the crushing plant during substantially its entire time, the first roller-feed to the left drawing off material deposited during the first two hours, then material deposited during the second two hours; the next roller-feed first drawing off material deposited during the first two hours, then material deposited during the second two hours, then material deposited during the third two hours, and, finally, material deposited during the fourth two hours; the third roller-feed first drawing off material deposited during the first two hours, then drawing off material deposited during the second two hours, then drawing off material deposited during the third two hours, then drawing off material deposited during the fourth two hours, and, finally, drawing off material deposited during the fifth two hours; the next roller-feed first drawing off material deposited during the second two hours, then drawing off material deposited during the third two hours, then drawing off material deposited during the fourth two hours, and, finally, drawing off material deposited during the fifth two hours; the next roller-feed first drawing off material deposited during the third two hours, then drawing off material deposited during the fourth two hours, and then drawing off material deposited during the fifth two hours, and the sixth roller-feed to the right drawing off material deposited during the third, fourth, and fifth two hours. The material thus drawn off will be deposited on the belt 16 in six layers, the bottom layer representing portions of the material deposited in the bin during the first and second periods of two hours, the next layer representing the first, second, third, and fourth two hours, the next layer representing the first, second, third, fourth, and fifth periods, the next layer representing the second, third, fourth, and fifth periods, the next layer representing the third, fourth, and fifth periods, and the next layer representing the third, fourth, and fifth periods. Although by drawing off material in this way a rough approximation of an average will be secured, it is desirable that the operation should be carried on to a further state of perfection, and therefore the material drawn off through the roller-feeds 15 onto the conveying-belt 16 is deposited on the mixing-belt 17, being further mixed in the transfer from one belt to the other, and is returned through the hopper 18 of one of the feed-spouts—as, for instance, that for the pile F—so as to be re-formed in a new cone. I illustrate this transfer of material, an averaging thereof to be taking place, from the cone E to the cone F. While a pile of cement-rock is illustrated as being formed at G in the first instance and a transfer from the cement-rock pile E is illustrated as taking place with the redeposit thereof at F, with the obvious averaging which will be secured by such transfer, the belt 21 is employed for carrying off from the stock-house material from any one of the piles into which it has been redeposited in an averaged condition. Thus I show the pile C of limestone as being carried off by the belt 21 while operating the roller-feeds 19 for such pile.

Instead of depositing the material in each bin in the form of a pile or cone, as explained, so that it will accumulate in inclined strata representing different periods of operation, the material may be deposited in each bin in any other form—as, for example, in the vertical compartments shown in the modified arrangement illustrated in Fig. 5. Thus the material representing the first period of time of the operation of the crushing plant may be deposited in the first compartment at the left, and when said compartment is full notification will be offered by overflow, whereupon the valve for the first opening 7 of the leg 40 will be opened to fill the second compartment, and so on. In removing the material from such a bin through all of the roller-feeds it will be observed that the material as it falls upon the belt 16 from each of the vertical compartments will be representative of the several periods of operation of the crushing plant in which the bin in question was being supplied with the material. The same general result is secured in one case as in the other, and any other arrangement of bins and forms of deposits can be utilized by which the result desired may be obtained. From the stock-house the material which has been thus averaged is carried by the belt 21 and deposited in the bin or receptacle 22 or 23, this operation being effected so as to keep said bins properly supplied with material. Assuming the bin 22 to contain cement-rock in a perfectly averaged condition from a known deposit, the assay of which has been determined by the chemist by making an assay of the samples as explained, the roller-feed 25 for said bin is operated and material is withdrawn therefrom to fill the receptacle 26, and the weight of this material is determined by the scales 28. The chemist knowing the assay of the cement-rock in the receptacle 26, it is only necessary therefore to operate the roller-feed 25 for the bin 23 and to accumulate in the receptacle 27 a sufficient amount of limestone as to result in a mixture of which a Portland cement of the desired quality can be obtained. When a sufficient amount of limestone has been accumulated in the receptacle 27, the roller-feed 25 for the bin 23 is stopped and both materials are deposited through the hoppers 30 into the mixer 31, where an intimate mixing of the two materials is effected, after which the mixed materials are allowed to drop out of the mixer into the hopper 32, from which they are deposited from the roller-feed 33 onto the conveying-belt 34 and are carried to a suitable stock-house ready for further operation.

Ordinarily with natural silicious cement-rock of the average proportions in the manufacture of Portland cement it will be a convenient operation to accumulate in the stock-house the cement-rock in three deposits during runs of three successive days to effect the averaging of such deposits on the days succeeding their original formation, to run the crushing plant on the limestone for one day to form a deposit thereof, and on the first day of the run on the cement-rock to effect the averaging of a deposit of limestone originally accumulated. In the withdrawal of the material off from the stock-house by means of the belt 21 it is only necessary to keep the storage-bins 22 and 23 properly supplied with material, care being of course taken not to carry upon the conveying-belt cement-rock and limestone at the same time.

While it is desirable that samples of the material going to the formation of each deposit should be taken out during the formation thereof in order that an average assay may be made which will correspond to that of the deposit after it has been redistributed and averaged as explained, whereby after such averaging the material may be immediately withdrawn from the stock-house, yet it will be understood that the material may be deposited in the first instance in the stock-house, as explained, then redistributed and averaged therein, and that from the deposit which has been thus averaged a portion may be taken as a sample which may be then assayed, which assay will be correctly representative of that of the deposit as a whole. Obviously the use of a sampling device effects a saving of time, since the material may be drawn off from the redistributed deposit immediately after the said cone is formed.

Having now described my invention, what I claim as new, and desire to secure by Letters Patent, is as follows:

1. Apparatus for averaging material in bulk whereby an even assay thereof can be secured, comprising a bin into which material is deposited, a second bin in which the material is redeposited, a feed-belt for depositing the material in the first bin, a belt below the bin for withdrawing the material therefrom, a mixing-belt onto which the material is deposited and by which the material will be deposited in the second bin, and a belt beneath the second bin for withdrawing off the material, substantially as set forth.

2. Apparatus for averaging material in bulk whereby an even assay thereof can be secured, comprising a stock-house having a capacity for a plurality of deposits in bulk, a feed-belt passing over the stock-house for depositing material into any one of the deposits, a conveying-belt beneath the deposits for withdrawing the material therefrom, a mixing-belt with which the conveying-belt connects for carrying the withdrawn material and redepositing it in the stock-house, and a conveying-belt for carrying off the redeposited material, substantially as set forth.

3. Apparatus for averaging material in bulk whereby an even assay thereof can be secured, comprising a bin in which the material may be deposited, a second bin in which the material may be redeposited in an averaged condition, means for depositing the material in the first bin, sampling mechanism for sampling the material before its introduction into said bin, means for withdrawing the material from the first bin and redepositing it in the second bin, and means for drawing off the redeposited material, substantially as set forth.

4. Apparatus for averaging material in bulk whereby an even assay thereof can be secured, comprising a stock-house, means for withdrawing material deposited in said stock-house from the bottom thereof, two conveying-belts beneath the stock-house, a mixing-belt extending above the stock-house and with which one of said conveying-belts connects, and a distributing-belt extending parallel with said mixing-belt at the top of the stock-house, substantially as set forth.

5. Apparatus for averaging material in bulk whereby an even assay thereof can be secured, comprising a plurality of bins into which the material may be deposited, an inclined feed-spout extending into each bin, means for feeding material to said spout, a plurality of openings in the bottom of said spout having manually-controlled valves, means for drawing off the material from the bottom of the several bins, and a belt beneath all of the bins for receiving material withdrawn therefrom, substantially as set forth.

6. Apparatus for averaging material in bulk whereby an even assay thereof can be secured, comprising a plurality of bins into which the material may be deposited, an inclined feed-spout extending into each bin, means for feeding material to said spout, a plurality of openings in the bottom of said spout having manually-controlled valves, a plurality of roller-feeds for drawing off the material from the bottom of each bin, and a belt beneath all of the bins for receiving material withdrawn therefrom, substantially as set forth.

7. Apparatus for averaging material in bulk whereby an even assay thereof can be secured, comprising a bin into which the material may be deposited, an inclined feed-spout extending into said bin, means for feeding material to said spout, a plurality of openings in the bottom of said spout having manually-controlled valves, a plurality of roller-feeds arranged in two series for drawing off the material from the bottom of the deposit, and two conveying-belts coöperating with said roller-feeds, substantially as set forth.

8. Apparatus for averaging and mixing materials in the manufacture of Portland cement, comprising a stock-house, means for depositing cement-rock and limestone in said stock-house in the form of separate deposits, means for separately drawing off the deposited material in an averaged condition, two storage-bins for the cement-rock and limestone respectively, a supplemental bin beneath each of said storage-bins and to which the material may be directed, means for weighing the supplemental storage-bins and the material carried therein, means for drawing off the material from the supplemental storage-bins, and a mixing apparatus to which the cement-rock and limestone from the supplemental storage-bins may be directed, substantially as set forth.

This specification signed and witnessed this 9th day of January, 1900.

THOMAS A. EDISON.

Witnesses:
J. F. RANDOLPH,
EDWIN E. HAGERTY.